(12) United States Patent
Koo et al.

(10) Patent No.: US 9,523,894 B2
(45) Date of Patent: Dec. 20, 2016

(54) DISPLAY DEVICE AND METHOD OF MANUFACTURING THE SAME

(71) Applicant: Samsung Display Co., Ltd., Yongin, Gyeonggi-Do (KR)

(72) Inventors: Bon-Yong Koo, Cheonan-si (KR); Dongyeon Son, Asan-si (KR)

(73) Assignee: Samsung Display Co. Ltd. (KR)

( * ) Notice: Subject to any disclaimer, the term of this patent is extended or adjusted under 35 U.S.C. 154(b) by 38 days.

(21) Appl. No.: 14/457,957

(22) Filed: Aug. 12, 2014

(65) Prior Publication Data

US 2015/0192810 A1 Jul. 9, 2015

(30) Foreign Application Priority Data

Jan. 7, 2014 (KR) .................. 10-2014-0001959

(51) Int. Cl.
| | | |
|---|---|---|
| *G02F 1/1339* | (2006.01) | |
| *G02F 1/1368* | (2006.01) | |
| *G02F 1/1362* | (2006.01) | |
| *G02F 1/1333* | (2006.01) | |
| *G02F 1/1343* | (2006.01) | |

(52) U.S. Cl.
CPC ..... *G02F 1/134363* (2013.01); *G02F 1/13394* (2013.01); *G02F 2001/134372* (2013.01)

(58) Field of Classification Search
None
See application file for complete search history.

(56) References Cited

U.S. PATENT DOCUMENTS

| | | | |
|---|---|---|---|
| 7,859,625 B2 | 12/2010 | Sonoda et al. | |
| 2005/0259210 A1* | 11/2005 | Lee ................... | G02F 1/134363 349/156 |
| 2007/0184367 A1 | 8/2007 | Kim et al. | |
| 2008/0291384 A1 | 11/2008 | Koyama | |
| 2012/0268702 A1 | 10/2012 | Imanishi et al. | |
| 2013/0093657 A1* | 4/2013 | Song ................... | G09G 3/3648 345/92 |

FOREIGN PATENT DOCUMENTS

| | | |
|---|---|---|
| JP | 2009-216976 | 9/2009 |
| KR | 1020030087479 A | 11/2003 |
| KR | 1020040081281 A | 9/2004 |
| KR | 1020060000279 A | 1/2006 |
| KR | 1020060088242 A | 8/2006 |
| KR | 1020080022994 A | 3/2008 |
| KR | 1020080048333 A | 6/2008 |
| KR | 1020130063404 A | 6/2013 |

* cited by examiner

*Primary Examiner* — Ashok Patel
(74) *Attorney, Agent, or Firm* — Innovation Counsel LLP

(57) ABSTRACT

A display device includes a first substrate, a second substrate, and a liquid crystal layer. The first substrate includes a common electrode, a pixel electrode, a first conductive layer spaced apart from the common electrode, and a second conductive layer disposed on the first conductive layer. The second substrate includes a spacer disposed to overlap with the first conductive layer and the second conductive layer on the first base substrate.

12 Claims, 14 Drawing Sheets

DISPLAY DEVICE AND METHOD OF MANUFACTURING THE SAME

CROSS-REFERENCE TO RELATED APPLICATION

This U.S. non-provisional patent application claims priority under 35 U.S.C. §119 of Korean Patent Application No. 10-2014-0001959, filed on Jan. 7, 2014, the contents of which are hereby incorporated by reference in their entirety.

BACKGROUND

1. Field

The present disclosure relates to a display device and a method of manufacturing the same. More particularly, the present disclosure relates to a display device having an improved display quality and a method of manufacturing the display device.

2. Description of the Related Art

A liquid crystal display includes a display panel including two substrates with a liquid crystal layer interposed between the two substrates, and a backlight unit providing light to the display panel. The liquid crystal layer includes liquid crystal molecules.

The liquid crystal display includes a spacer disposed between the two substrates. The spacer maintains a distance between the two substrates and absorbs an external impact applied thereto.

When an external force is applied to a lower substrate of the two substrates, a position of the spacer is changed, and when the external force disappears, the spacer returns to its original position before the external touch occurs.

Due to the change in position of the spacer, an alignment layer disposed on the lower substrate is damaged, and thus the damaged alignment layer does not control the liquid crystal molecules. Consequently, light leakage occurs in an area corresponding to the damaged alignment layer.

In addition, sometimes the spacer does not return to its original position, and when the spacer does not return to its original position, the liquid crystal molecules around the spacer are not controlled normally. Consequently, the light leakage occurs around the spacer.

SUMMARY

The present disclosure provides a display device capable of reducing a light leakage to improve a display quality thereof.

The present disclosure provides a method of manufacturing the display device.

In one aspect, a display device includes a first substrate, a second substrate including a display area and a non-display area and facing the first substrate, and a liquid crystal layer interposed between the first substrate and the second substrate. The first substrate includes a first base substrate, a common electrode disposed on the first base substrate, a pixel electrode disposed to overlap with the common electrode and insulated from the common electrode, a first conductive layer disposed at a position on the first base substrate overlapping, in a plan view, a position of the non-display area on the second base substrate, the first conductive layer spaced apart from the common electrode, and a second conductive layer disposed on the first conductive layer. The second substrate includes a second base substrate and a spacer disposed on the second base substrate to overlap with the first conductive layer and the second conductive layer when viewed in a plan view.

The first conductive layer may include a same material as the common electrode.

The first substrate may further include a gate line extending in a first direction, a data line extending in a second direction substantially perpendicular to the first direction, and a thin film transistor connected to the gate line and the data line configured to apply a signal to the pixel electrode.

The first substrate may further include an insulating layer disposed on the thin film transistor, and the common electrode and the first conductive layer may bed is posed on the insulating layer. The first conductive layer may include the same material as that of the common electrode. The first conductive layer may have a size equal to or greater than that of the spacer when viewed in a plan view.

The first substrate may include an auxiliary line electrically connected to the common electrode to apply a common voltage to the common electrode and a second conductive layer overlapped with the first conductive layer.

The auxiliary line may overlap with the gate line and extend in the first direction.

The second conductive layer may include the same material as the auxiliary line, such as a metal material. The second conductive layer may have a size equal to or greater than a size of the first conductive layer when viewed in a plan view.

The pixel electrode may include a plurality of slits.

In another aspect, a method of manufacturing a display device includes forming a common electrode and a first conductive layer, which is spaced apart from the common electrode, on a first base substrate, forming a second conductive layer on the first conductive layer to make contact with the first conductive layer, forming a pixel electrode on the first base substrate to overlap with the common electrode, forming a spacer on a second base substrate, and coupling the first base substrate to the second base substrate with a liquid crystal layer and the spacer interposed between the first base substrate and the second base substrate. The spacer is disposed to overlap with the first conductive layer and the second conductive layer when viewed in a plan view.

The common electrode and the first conductive layer may be formed by a first process using one mask. The first process may include forming a conductive material over an entire surface of the first base substrate and patterning the conductive material. The first conductive layer may be spaced apart from the common electrode and an opening, which is formed by removing a portion of the conductive material, may be interposed between the first conductive layer and the common electrode.

The method may further include forming an auxiliary line after forming the common electrode. The auxiliary line and the second conductive layer may be formed by a second process using one mask. The second process may include forming a conductive material on the common electrode and patterning the conductive material to form the auxiliary line and the second conductive layer, which may be spaced apart from each other.

According to the above, the alignment layer may be prevented from being damaged even though the position of the spacer is changed. Thus, the light leakage of the display device may be prevented from occurring and the display quality of the display device may be improved.

BRIEF DESCRIPTION OF THE DRAWINGS

The above and other aspects of the present disclosure will become readily apparent by reference to the following detailed description when considered in conjunction with the accompanying drawings wherein.

DETAILED DESCRIPTION

Figure 1:
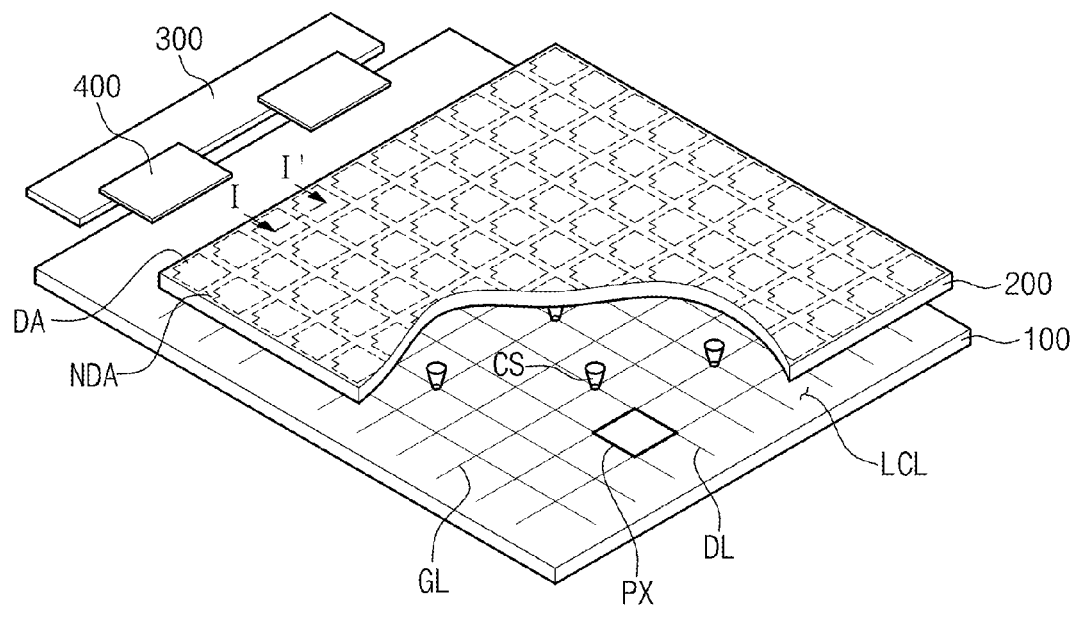
FIG. 1 is a perspective view showing a display device according to an example embodiment of the present disclosure.

It will be understood that when an element or layer is referred to as being "on", "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present. Like reference numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section discussed below could be termed a second element, component, region, layer or section without departing from the teachings of the present disclosure.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below, depending on the orientation of the device as a whole. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present disclosure will be explained in detail with reference to the accompanying drawings.

Figure 2:
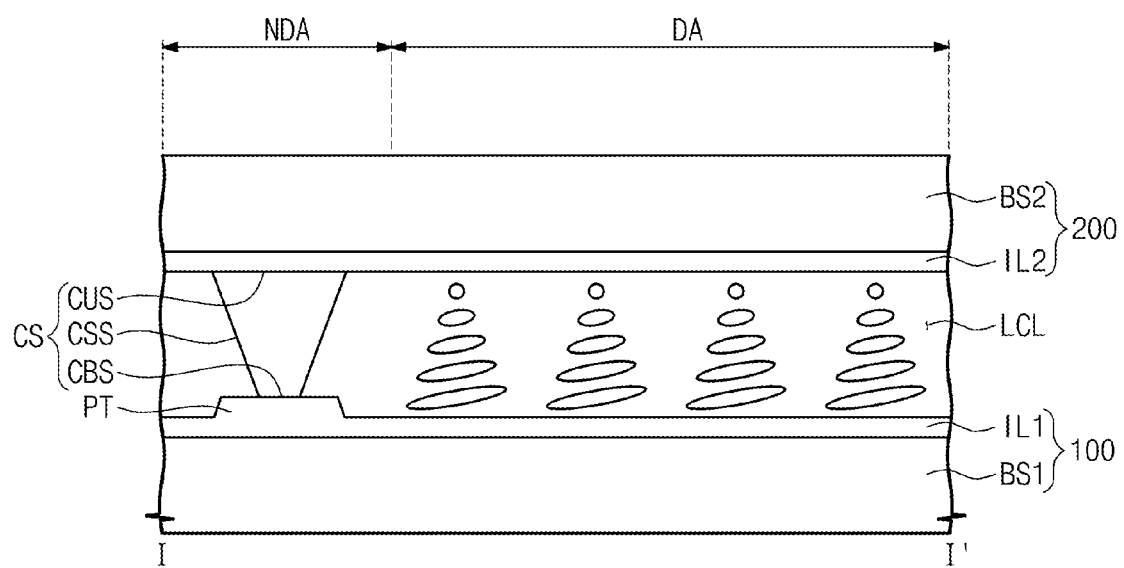
FIG. 2 is a cross-sectional view taken along a line I-I' of FIG. 1.

FIG. 1 is a perspective view showing a display device according to an example embodiment of the present disclosure and FIG. 2 is a cross-sectional view taken along a line I-I' of FIG. 1.

The display device according to the present example embodiment of the present disclosure includes a display panel displaying an image and a driving part driving the display panel. Although not shown in the figures, the display device includes polarization plates disposed on lower and upper portions of the display panel, respectively, and a backlight unit disposed at the lower portion of the display panel, as are understood by persons having ordinary skill in the art.

Referring to FIG. 1, the display panel includes a first substrate 100, a second substrate 200 facing the first substrate 100, and a liquid crystal layer LCL.

The first substrate 100 includes a plurality of gate lines GL extending in a first direction D1 and a plurality of data lines DL extending in a second direction D2 that is substantially perpendicular to the first direction D1. The gate lines GL receive gate signals and the data lines DL receive data voltages.

The gate lines GL are insulated from the data lines DL while crossing the data lines DL. For instance, the gate lines GL are disposed on a layer different from a layer on which the data lines DL are disposed. An organic or inorganic layer may be interposed between the gate lines GL and the data lines DL.

In addition, the first substrate 100 includes a plurality of pixels PX. Each of the pixels PX is connected to a corresponding gate line of the gate lines GL and a corresponding data line of the data lines DL.

Although not shown in figures, each of the pixels PX includes a thin film transistor connected to the corresponding gate line and the corresponding data line and a liquid crystal capacitor connected to the thin film transistor.

The second substrate 200 includes a plurality of display areas DA through which a light provided from the backlight unit passes to display an image and a non-display area NDA except for the display areas DA.

Each of the display areas DA is disposed in a position on the second substrate 200 to correspond to a position of a pixel PX on the first substrate 100, respectively, and in particular, each display area DA overlaps a pixel PX. The non-display area NDA is disposed in a position on the second substrate 200 that corresponds to the position of a boundary between the pixels PX on the first substrate 100, and, in particular, the non-display area NDA overlaps a boundary area between pixels PX. Particularly, the non-display area NDA overlaps with the gate lines GL and the data lines DL.

The second substrate 200 may include a spacer CS disposed in the non-display area NDA. The spacer CS maintains a distance between the first substrate 100 and the second substrate 200 and absorbs external impacts applied thereto. Multiple spacers CS may be provided and the spacers CS may be disposed with a predetermined distance therebetween.

Although not shown in figures, the driving part includes a timing controller, a gate driver, and a data driver. The timing controller receives input image signals and converts the input image signals to image data suitable for an operation mode of the display panel to output the image data and various control signals.

The gate driver applies the gate signals to the gate lines GL. The data driver converts the image data to the data voltages and applies the data voltages to the data lines DL.

The timing controller is disposed on a printed circuit board 300. The data driver is connected to the first substrate 100 in a tape carrier package 400 (TCP) manner. The gate driver is connected to the first substrate 100 in the TCP manner or directly disposed on the first substrate 100.

Referring to FIG. 2, the first substrate 100 includes a first base substrate BS1 and an insulating layer IL1 disposed on the first base substrate BS1. The insulating layer IL1 may include a plurality of layers, e.g., an organic layer and/or an inorganic layer. Although not shown in figures, the gate lines GL (refer to FIG. 1) and the data lines DL (refer to FIG. 1) are disposed on different layers among the layers of insulating layer IL1. The insulating layer IL1 includes a protrusion portion PT disposed at a positions corresponding to the position of a portion of the non-display area NDA.

The second substrate 200 may include a second base substrate BS2 and a buffer layer IL2 disposed on the second base substrate BS2. The buffer layer IL2 may include a plurality of layers. For instance, the buffer layer IL2 may include a color filter layer and a light blocking layer. The color filter layer may have a red, green, or blue color depending on the area in which the color filter layer is disposed.

The liquid crystal layer LCL is interposed between the insulating layer IL1 and the buffer layer IL2. The liquid crystal layer LCL includes liquid crystal molecules.

The spacer CS may include an upper surface CUS, a lower surface CBS, and a side surface CSS connecting the upper surface CUS and the lower surface CBS. When viewed in a plan view, the lower surface CBS of the spacer CS has a size smaller than that of the upper surface CUS. However, the shape of the spacer CS should not be limited thereto or thereby. That is, the size of the lower surface CBS of the spacer CS may be equal to or greater than that of the upper surface CUS when viewed in a plan view.

The spacer CS is disposed on the buffer layer IL2. That is, the upper surface CUS of the spacer CS makes contact with one surface of the buffer layer IL2. The lower surface CBS of the spacer CS makes contact with the protrusion portion PT when the first substrate 100 is coupled to the second substrate 200.

Figure 3:
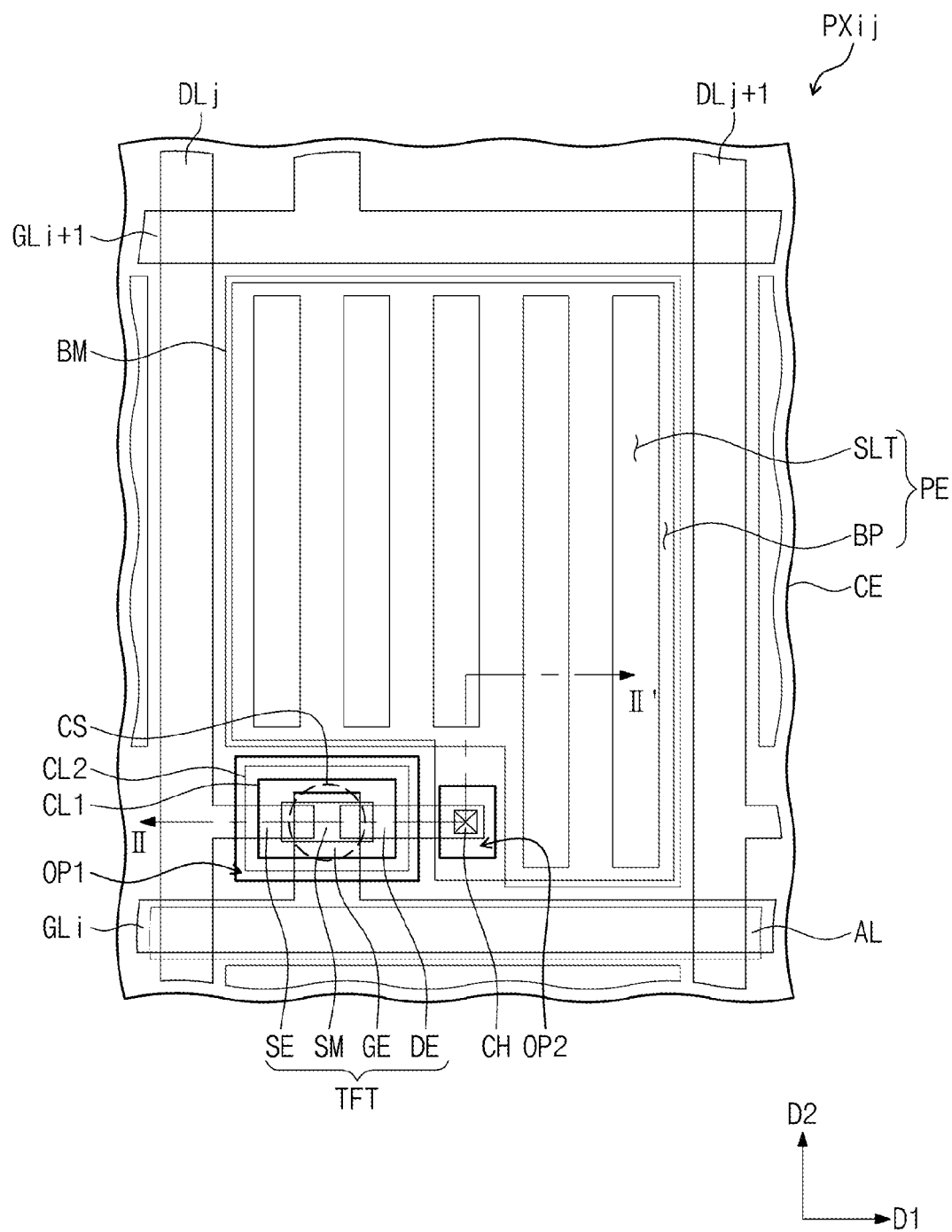
FIG. 3 is a plan view showing a pixel according to an example embodiment of the present disclosure.
Figure 4:
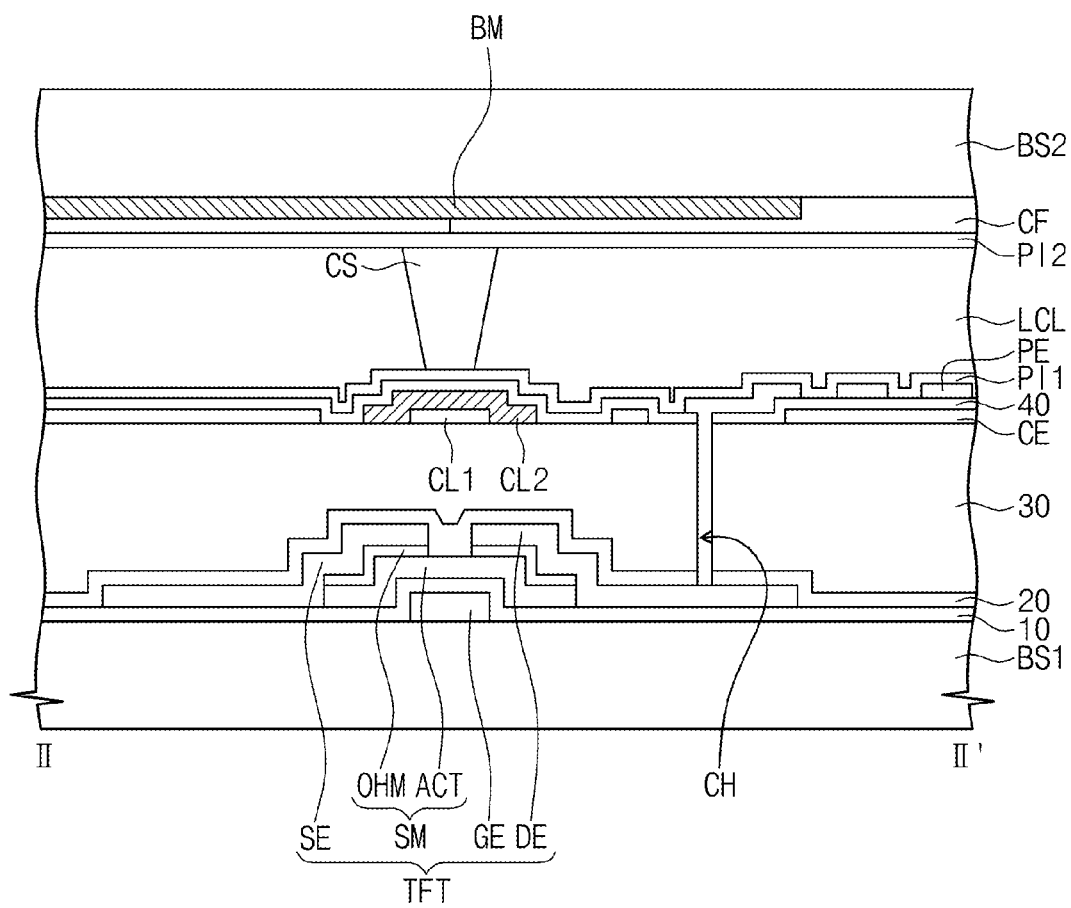
FIG. 4 is a cross-sectional view taken along a line II-II' of FIG. 3.

FIG. 3 is a plan view showing the pixel according to an example embodiment of the present disclosure and FIG. 4 is a cross-sectional view taken along a line II-II' of FIG. 3. FIG. 4 shows a layout of the first substrate 100 together with the black matrix BM. In the present example embodiment, the spacer CS is disposed in a position so as to overlap with the position of the thin film transistor TFT.

FIGS. 3 and 4 show the pixel driven in a horizontal switching mode, however, the driving mode of the pixel should not be limited to the horizontal switching mode. That is, the pixel may be driven in various modes, e.g., a vertical alignment mode, a twisted nematic mode, etc.

Referring to FIG. 3, the pixel PXij includes a pixel electrode PE, a common electrode CE overlapped with the pixel electrode PE and insulated from the pixel electrode PE, an auxiliary line AL disposed on the common electrode CE, and the thin film transistor TFT applying the data voltage to the pixel electrode PE.

The thin film transistor TFT is connected to the corresponding gate line GLi of the gate lines GL and the corresponding data line DLj of the data lines DL. The thin film transistor TFT includes a gate electrode GE, a source electrode SE, a drain electrode DE, and a semiconductor layer SM.

The pixel electrode PE includes a plurality of slits SLT and a plurality of branch portions BP, which are alternately arranged with the slits SLT. The pixel electrode PE is connected to the thin film transistor TFT through a contact hole CH.

The common electrode CE is provided with a first opening OP1, which is formed along edges of the protrusion portion PT (refer to FIG. 2) corresponding to the area where the protrusion portion PT is formed. In addition, the common electrode CE is provided with a second opening OP2 corresponding to the area where the contact hole CH is formed.

The protrusion portion PT is formed by overlapping at least two conductive layers with each other. In the present example embodiment, the protrusion portion PT includes a first conductive layer CL1 spaced apart from the common electrode CE and a second conductive layer CL2 disposed on the first conductive layer CL1.

The first conductive layer CL1 is disposed to correspond to the area where the spacer CS is disposed and spaced apart from the common electrode CE. When viewed in a plan view, the first conductive layer CL1 has a size that is equal to or greater than that of the spacer CS. In the present example embodiment, the first conductive layer CL1 has a rectangular shape in a plan view, however, the shape of the first conductive layer CL1 should not be limited to the rectangular shape. That is, the first conductive layer CL1 may have a circular shape or a polygonal shape.

The first opening OP1 is disposed along edges of the first conductive layer CL1. Thus, the first conductive layer CL1 is spaced apart from the common electrode CE while the first opening OP1 is interposed between the first conductive layer CL1 and the common electrode CE. The first conductive layer CL1 includes the same material as the common electrode CE.

The second conductive layer CL2 is disposed on the first conductive layer CL1 to make contact with the first conductive layer CL1. When viewed in a plan view, the second conductive layer CL2 has a size equal to that of the first conductive layer CL1. In addition, the second conductive layer CL2 may have a size greater than that of the first conductive layer CL1 when viewed in a plan view. In this case, the second conductive layer CL2 is spaced apart from the common electrode CE, and the second conductive layer CL2 is partially overlapped with the first opening OP1 when viewed in a plan view.

The auxiliary line AL is electrically connected to the common electrode CE to apply a common voltage to the common electrode CE. The auxiliary line AL extends in the first direction D1 along the gate line GLi on the common electrode CE. However, the auxiliary line AL may alternatively extend in the second direction D2 along the data line DLj. The auxiliary line AL may be provided to each of the gate lines GL (refer to FIG. 1) or each of the data lines DL (refer to FIG. 1), or the auxiliary line AL may be provided to some of the gate lines GL or some of the data lines DL.

In the present example embodiment, the second conductive layer CL2 may include the same material as the auxiliary line AL. As the second conductive layer CL2 is disposed on the first conductive layer CL1 and the auxiliary line AL is disposed on the common electrode CE, the second conductive layer CL2 and the auxiliary line AL are disposed in the same plane. In detail, the second conductive layer CL2 and the auxiliary line AL may include the metal material.

When a driving voltage is applied to the common electrode CE and the pixel electrode PE, a fringe electric field is generated between the common electrode CE and the pixel electrode PE.

An alignment direction of the liquid crystal molecules is changed by the fringe electric field. The alignment direction of the liquid crystal molecules changed by the fringe electric field is maintained for a predetermined time period. That is, the common electrode CE forms the liquid crystal capacitor together with the pixel electrode PE, and the alignment direction of the liquid crystal molecules is maintained for the predetermined time period by a voltage charged in the liquid crystal capacitor.

The second substrate 200 includes the black matrix BM disposed on the second base substrate BS2. The black matrix BM overlaps with the corresponding gate line GLi, the corresponding data line DLj, and the thin film transistor TFT. The black matrix BM includes a plurality of openings (not shown) corresponding to the display areas DA (refer to FIG. 1).

As shown in FIG. 4, a first insulating layer 10 is disposed on the first base substrate BS1 to cover the gate electrode GE. The first insulating layer 10 may include silicon nitride or silicon oxide.

The semiconductor layer SM is disposed on the first insulating layer 10. The semiconductor layer SM is overlapped with the gate electrode GE while the first insulating layer 10 is interposed between the semiconductor layer SM and the gate electrode GE. The semiconductor layer SM includes an active layer ACT and an ohmic contact layer OHM disposed on the active layer ACT.

The source electrode SE and the drain electrode DE are disposed on the first insulting layer 10. The source electrode SE and the drain electrode DE are spaced apart from each other. Each of the source electrode SE and the drain electrode DE is overlapped with the semiconductor layer SM.

A second insulating layer 20 is disposed on the first insulating layer 10. The second insulating layer 20 may include silicon nitride or silicon oxide.

A third insulating layer 30 is disposed on the second insulating layer 20. The third insulating layer 30 protects the thin film transistor TFT and planarizes an upper surface of the first base substrate BS1 on which the thin film transistor TFT is disposed. The common electrode CE and the first conductive layer CL1 are disposed on the third insulating layer 30. The second conductive layer CL2 is disposed on the first conductive layer CL1.

A fourth insulating layer 40 is disposed on the third insulating layer 30 to cover the common electrode CE and the second conductive layer CL2. The pixel electrode PE is disposed on the fourth insulating layer 40.

The pixel electrode PE is connected to the drain electrode DE through the contact hole CH formed penetrating through the second, third, and fourth insulating layers 20, 30, and 40.

A first alignment layer PH is disposed on the pixel electrode PE. The first alignment layer PH is used to initially align (e.g., pre-tilt) the liquid crystal molecules. To this end, the first alignment layer PH may include any suitable organic polymer, such as polyimide, polyamic acid, and/or the like. It is noted that the first alignment layer PH may be light cured and/or include one or more sub-alignment molecules to facilitate pre-alignment of the liquid crystal molecules.

A protection layer (not shown) may further be disposed between the pixel electrode PE and the first alignment layer PH to cover the pixel electrode PE.

The black matrix BM is disposed on the second base substrate BS2. The black matrix BM may be an organic or inorganic layer containing dyes or pigments. Also, the black matrix BM includes a metal material.

The color filter layer CF is disposed on the second base substrate BS2. The color filter layer CF covers the black matrix BM. In addition, a second alignment layer PI2 may be disposed on the color filter layer CF.

The spacer CS is disposed on the second base substrate BS2. The second base substrate BS2 having the spacer CS formed thereon is coupled to the first base substrate BS1 and the spacer CS is interposed between the second base substrate BS2 and the first base substrate BS1. The liquid crystal layer LCL including the liquid crystal molecules is interposed between the first base substrate BS1 and the second base substrate BS2.

As described above, the second conductive layer CL2 is disposed on the first conductive layer CL1 such that the protrusion portion PT is formed on the first base substrate BS1. As in a conventional display device, in a case that the spacer CS is disposed on the lower substrate that is flat, an alignment layer, which is disposed on the lower substrate, is damaged due to a movement in position of the spacer CS when external impacts are applied to the lower substrate, thereby causing light leakage. However, according to the present example embodiment, because the spacer CS is disposed on the protrusion portion PT which includes the first conductive layer CL1 and the second conductive layer CL2, the spacer CS may be contact with the first alignment PH which is disposed in the protrusion portion PT. And the spacer CS may be prevented from making contact with the first alignment layer PH which is disposed in an area except for the area where the protrusion portion PT is disposed. Thus, the alignment layer may be prevented from being damaged and the light leakage of the display device may be prevented, thereby improving the display quality of the display device.

In addition, according to the present example embodiment, the common voltage is effectively applied to the common electrode CE because the display device includes the auxiliary line AL formed of a material having a high conductivity, for instance, a metal material.

FIGS. 5A, 6A, 7A, 8A, and 9A are cross-sectional views showing a manufacturing method of the display device according to an example embodiment of the present disclosure, and FIGS. 5B, 6B, 7B, 8B, and 9B are cross-sectional views respectively taken along lines II-II' of FIGS. 5A, 6A, 7A, 8A, and 9A.

Hereinafter, the manufacturing method of the display device will be described in detail with reference to FIGS. 5A, 6A, 7A, 8A, and 9A and FIGS. 5B, 6B, 7B, 8B, and 9B. For the convenience of explanation, the same reference numerals denote the same elements in previously described embodiments, and thus the detailed descriptions of the same elements will be omitted.

Figure 5A:
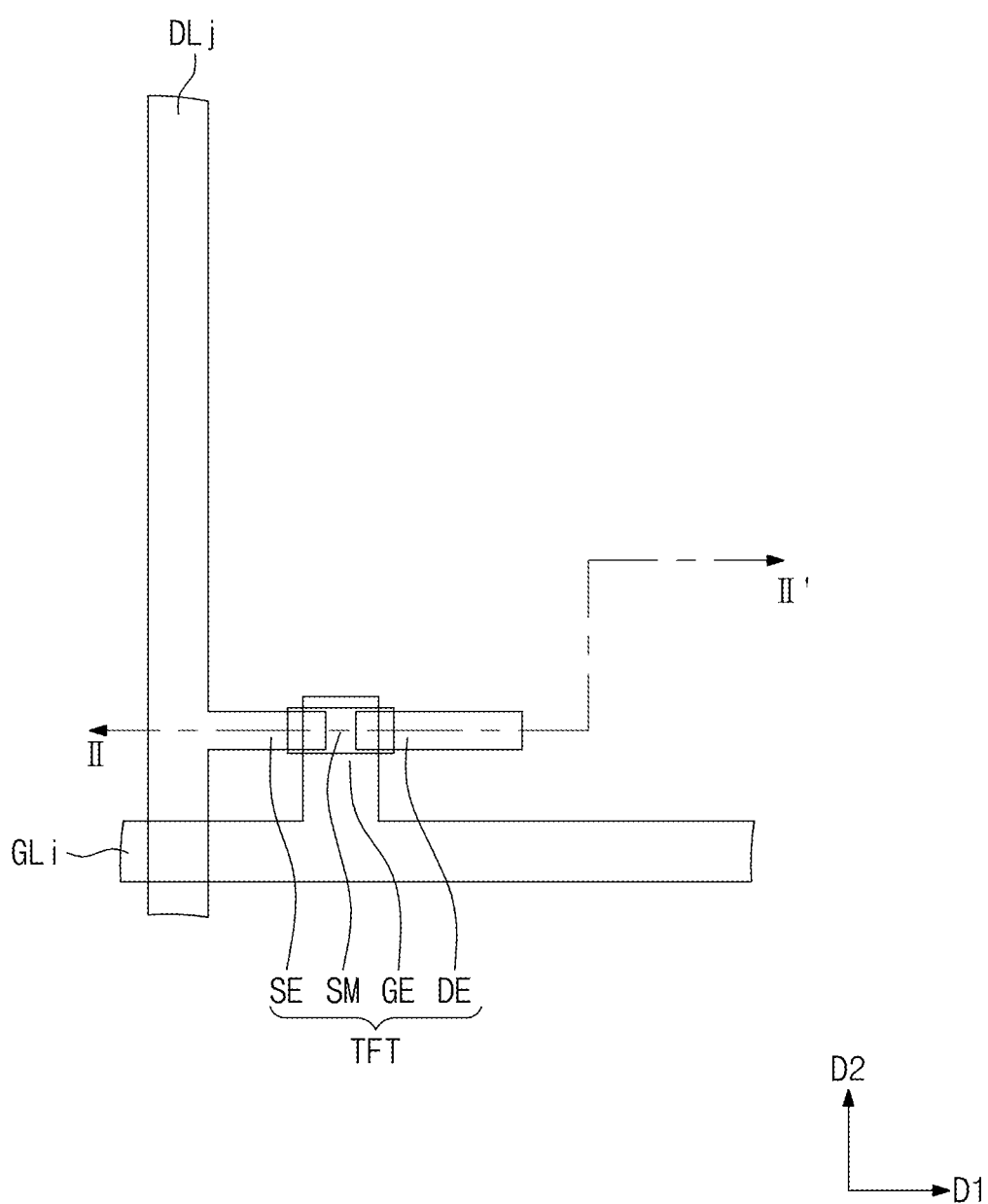
FIGS. 5A, 6A, 7A, 8A, and 9A are cross-sectional views showing a manufacturing method of the display device according to an example embodiment of the present disclosure.
Figure 5B:
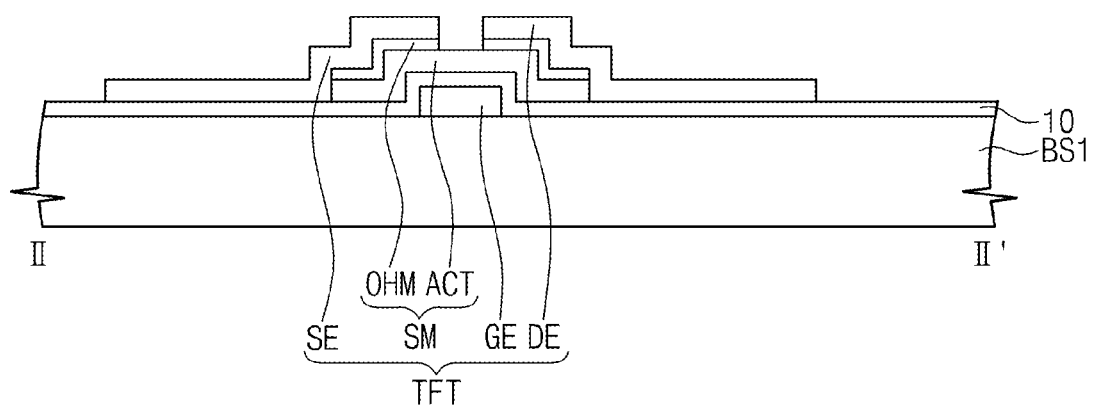
FIGS. 5B, 6B, 7B, 8B, and 9B are cross-sectional views respectively taken along lines II-II' of FIGS. 5A, 6A, 7A, 8A, and 9A.

Referring to FIGS. 5A and 5B, a gate line part is formed on the first base substrate BS1. The gate line part includes the gate line GLi extending in the first direction D1 and the gate electrode GE protruded from the gate line GLi.

The gate line part is formed of a conductive material, such as metal. The gate line part is formed by forming a metal layer over an entire surface of the first base substrate BS1 and patterning the metal layer using a photolithography process. The gate line part has a single-layer structure of a single metal or a metal alloy, but it should not be limited thereto or thereby. That is, the gate line part may have a multiple-layer structure of two or more metals and/or alloys thereof.

The first insulating layer 10 is formed on the gate line part, and the semiconductor layer SM is formed on the first insulating layer 10. The semiconductor layer SM is disposed on the gate electrode GE and partially overlapped with the gate electrode GE when viewed in a plan view. The semiconductor layer SM includes doped or non-doped silicon, or oxide semiconductor.

A data line part is formed on the semiconductor layer SM. The data line part includes the data line DLj extending in the second direction D2 substantially perpendicular to the first direction D1, the source electrode SE protruded from the data line DLj, and the drain electrode DE spaced apart from the source electrode SE.

The data line part is formed of a conductive material, e.g., a metal material. The data line part is formed by forming a metal layer over the entire surface of the first base substrate BS1 and patterning the metal layer using a photolithography process. The data line part has a single-layer structure of a single metal or a metal alloy, but it should not be limited thereto or thereby. That is, the data line part may have a multiple-layer structure of two or more metals and/or alloys thereof.

The gate electrode GE, the source electrode SE, the drain electrode DE, and the semiconductor layer SM form the thin film transistor TFT.

Figure 6A:
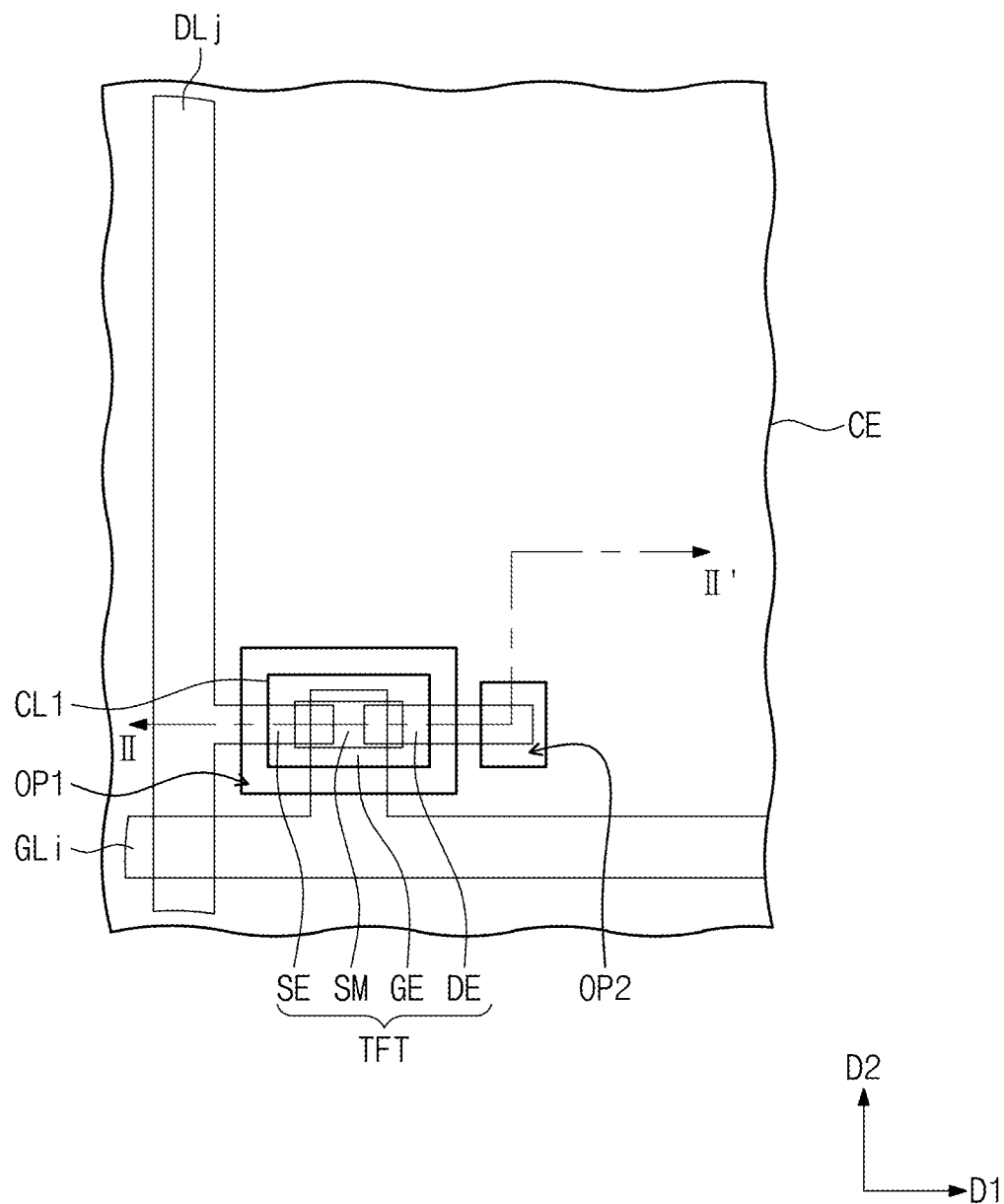
Figure 6B:
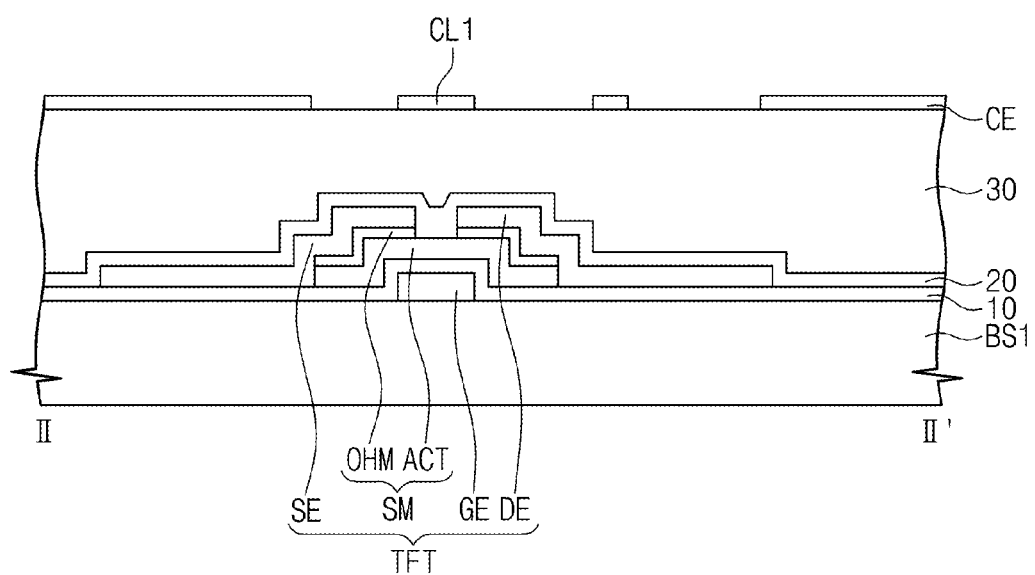

Referring to FIGS. 6A and 6B, the second insulating layer 20 is formed on the thin film transistor TFT, and the third insulating layer 30 is formed on the second insulating layer 20. The second insulating layer 20 includes an inorganic insulating material, and the third insulating layer 30 includes an organic insulating material.

The common electrode CE and the first conductive layer CL1 are formed on the third insulating layer 30. The common electrode CE and the first conductive layer CL1 include a conductive material, such as a metal material. The common electrode CE and the first conductive layer CL1 are formed by forming the conductive material over the entire surface of the first base substrate BS1 and patterning the conductive material through a first photolithography process using one mask. The common electrode CE and the first conductive layer CL1 have a single-layer structure of a single metal or a metal alloy, however, it should not be limited thereto or thereby. That is, the common electrode CE and the first conductive layer CL1 may have a multiple-layer structure of two or more metals and/or alloys thereof.

The first conductive layer CL1 has the rectangular shape when viewed in a plan view, however, the shape of the first conductive layer CL1 should not be limited to the rectangular shape. That is, the first conductive layer CL1 may have various shapes, e.g., a circular shape, a polygonal shape, etc. The first conductive layer CL1 is spaced apart from the common electrode CE while the first opening OP1, which is formed by removing the conductive material along the edges of the first conductive layer CL1, is interposed between the first conductive layer CL1 and the common electrode CE. The second opening OP2, which is formed by removing the conductive material corresponding to the area where the contact hole CH is formed, may be formed during the process used to form the common electrode CE.

Figure 7A:
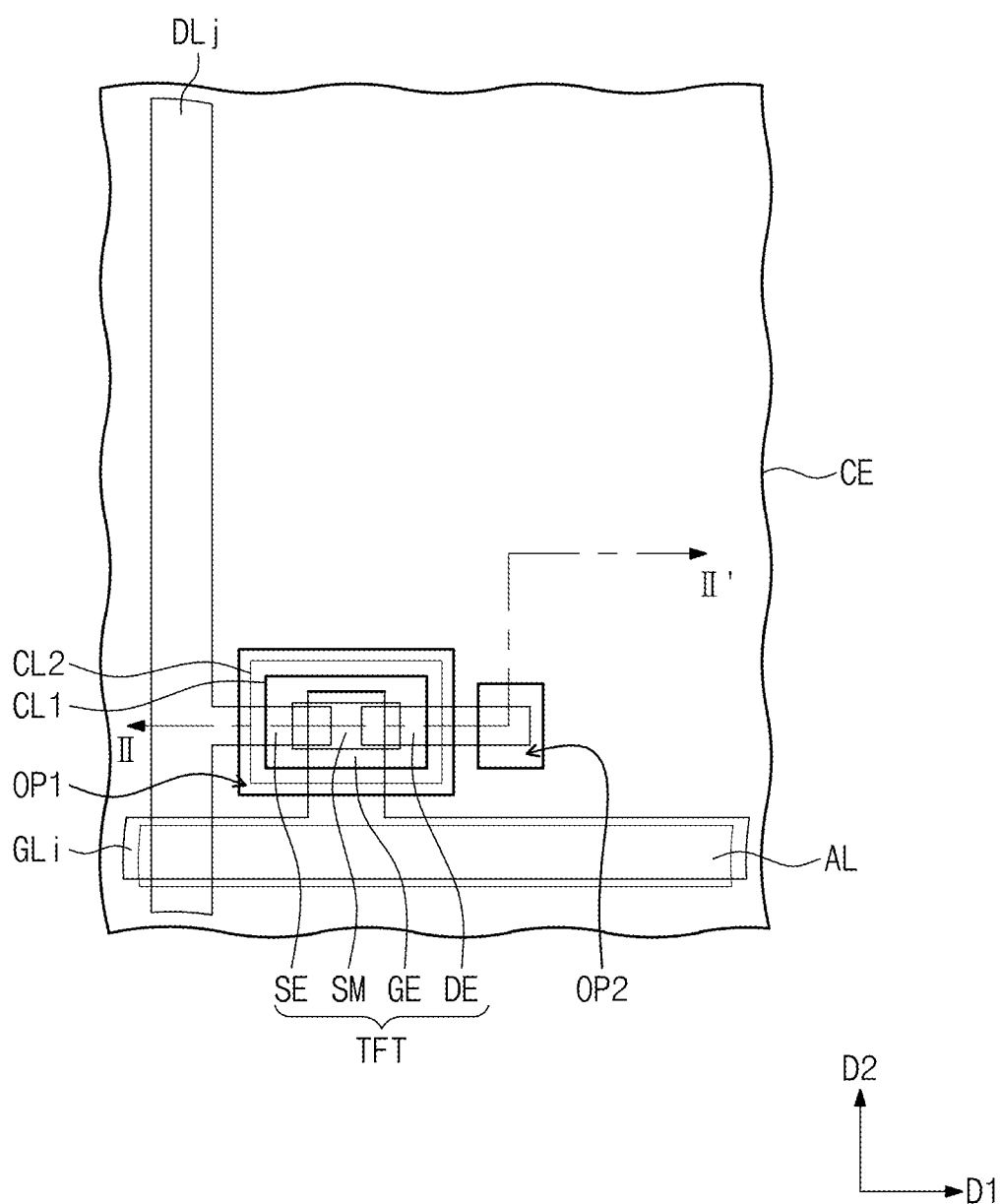
Figure 7B:
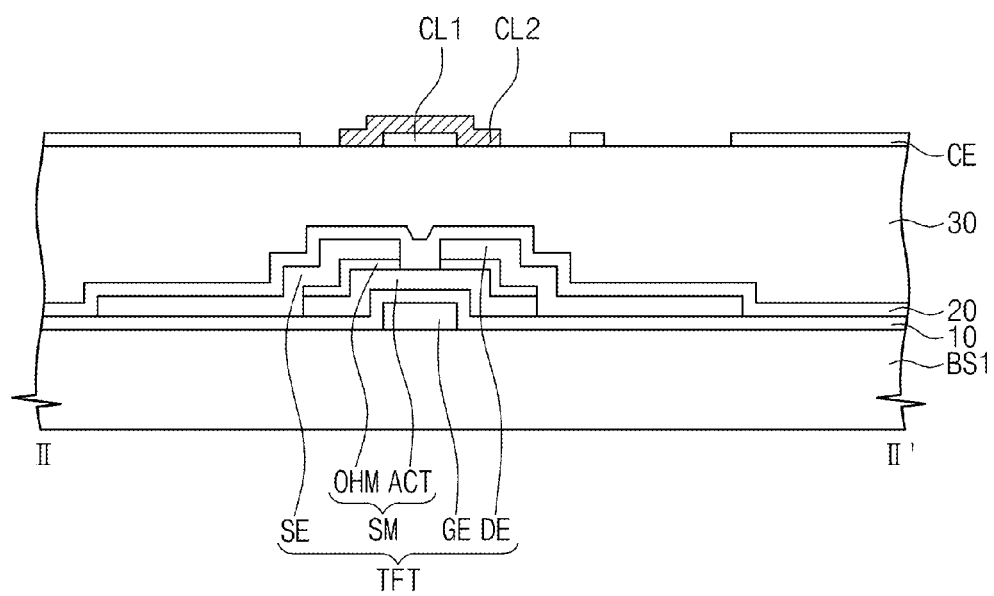

Referring to FIGS. 7A and 7B, the auxiliary line AL and the second conductive layer CL2 are formed on the common electrode CE and the first conductive layer CL1.

The auxiliary line AL and the second conductive layer CL2 are formed of a conductive material, such as a metal material. The auxiliary line AL and the second conductive layer CL2 are formed by forming the conductive material over the entire surface of the first base substrate BS1 and patterning the conductive material through a second photolithography process using one mask. The auxiliary line AL and the second conductive layer CL2 have a single-layer structure of a single metal or a metal alloy, however, it should not be limited thereto or thereby. That is, the auxiliary line AL and the second conductive layer CL2 may have a multiple-layer structure of two or more metals and/or alloys thereof.

The auxiliary line AL is overlapped with the corresponding gate line GLi and extends in the first direction D1. The second conductive layer CL2 is spaced apart from the auxiliary line AL and formed on the first conductive layer CL1 while making contact with the first conductive layer CL1. The second conductive layer CL2 has the size equal to or greater than that of the first conductive layer CL1 when viewed in a plan view. The second conductive layer CL2 may partially overlap with the first opening portion OP1 formed when forming the first conductive layer CL1 and may be spaced apart from the common electrode CE.

Figure 8A:
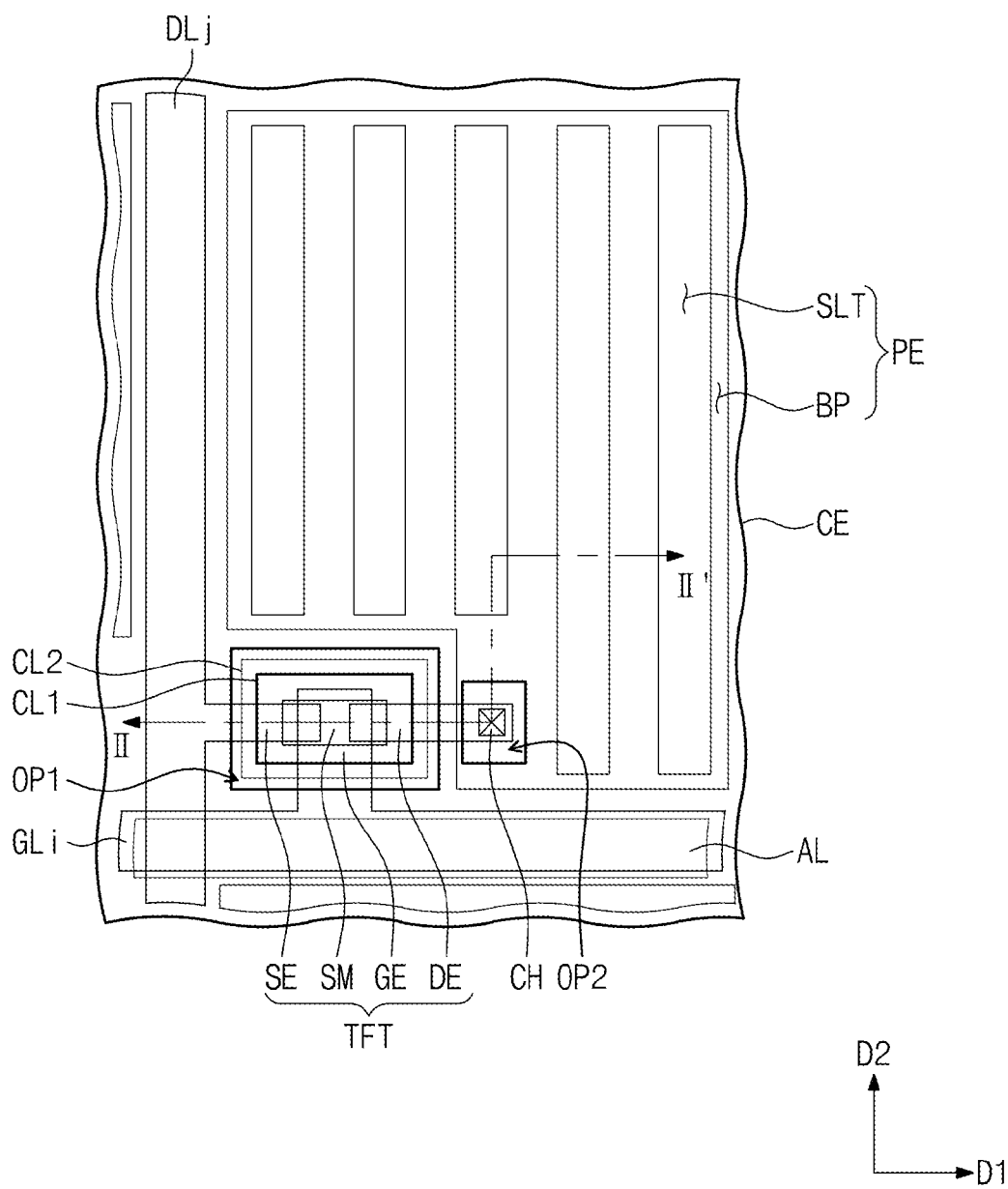
Figure 8B:
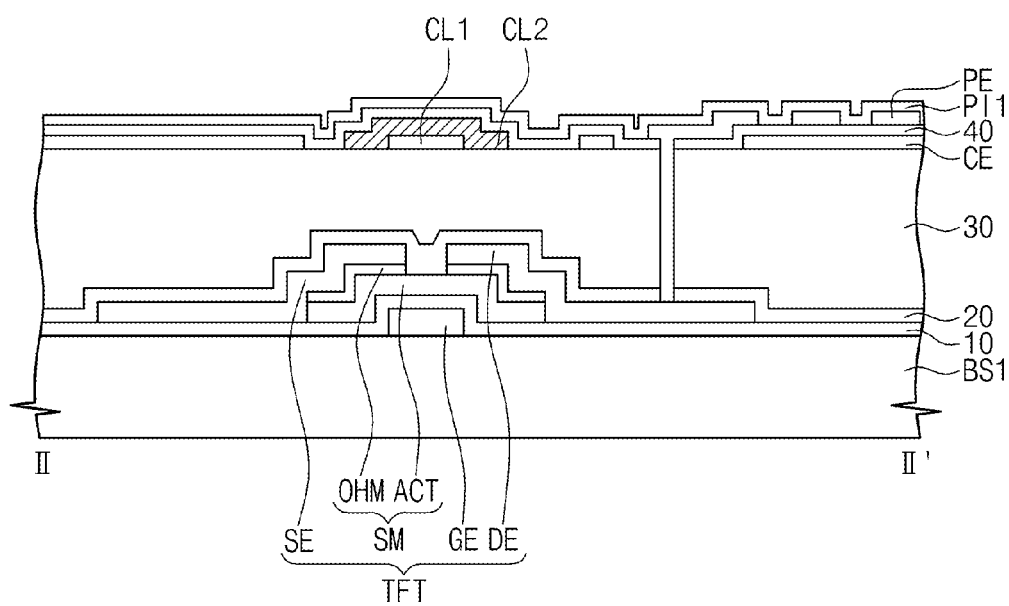

Referring to FIGS. 8A and 8B, the fourth insulating layer 40 is formed on the common electrode CE, the auxiliary line AL, and the second conductive layer CL2. After the fourth insulating layer 40 is formed, the contact hole CH is formed penetrating through the second, third, and fourth insulating layers 20, 30, and 40 by using a photolithography process. The pixel electrode PE, which is overlapped with the common electrode CE, is formed on the fourth insulating layer 40 through which the contact hole CH is formed.

The pixel electrode PE is formed of a conductive material, such as a metal material. The pixel electrode PE is formed by forming the conductive material over the entire surface of the first base substrate BS1 and patterning the conductive material through a photolithography process. The pixel electrode PE has a single-layer structure of a single metal or a metal alloy, but it should not be limited thereto or thereby. That is, the pixel electrode PE may have a multiple-layer structure of two or more metals and/or alloys thereof.

The pixel electrode PE includes the slits SLT and the branch portions BP alternately arranged with the slits SLT. The pixel electrode PE is connected to the thin film transistor TFT through the contact hole CH.

Figure 9A:
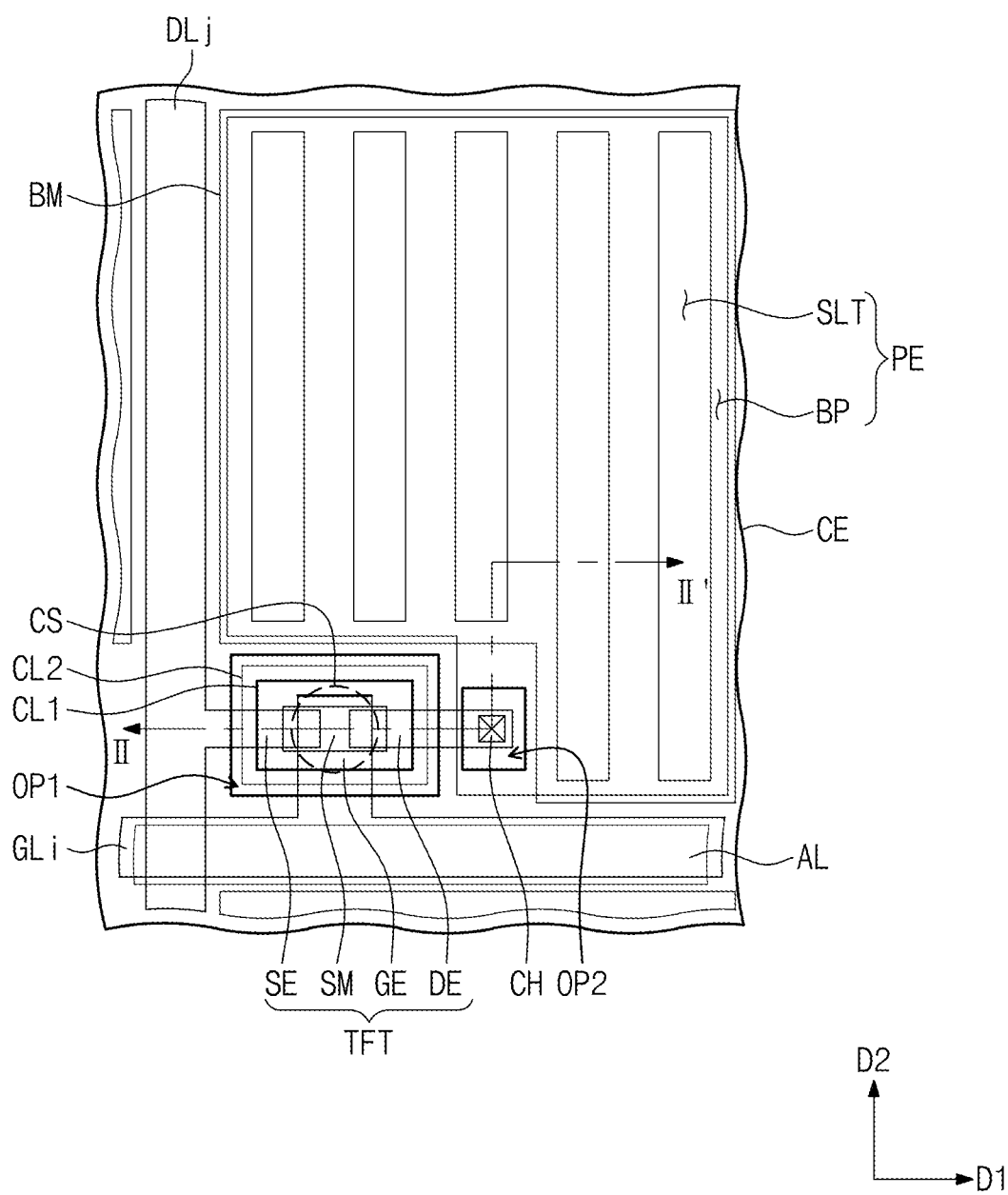
Figure 9B:
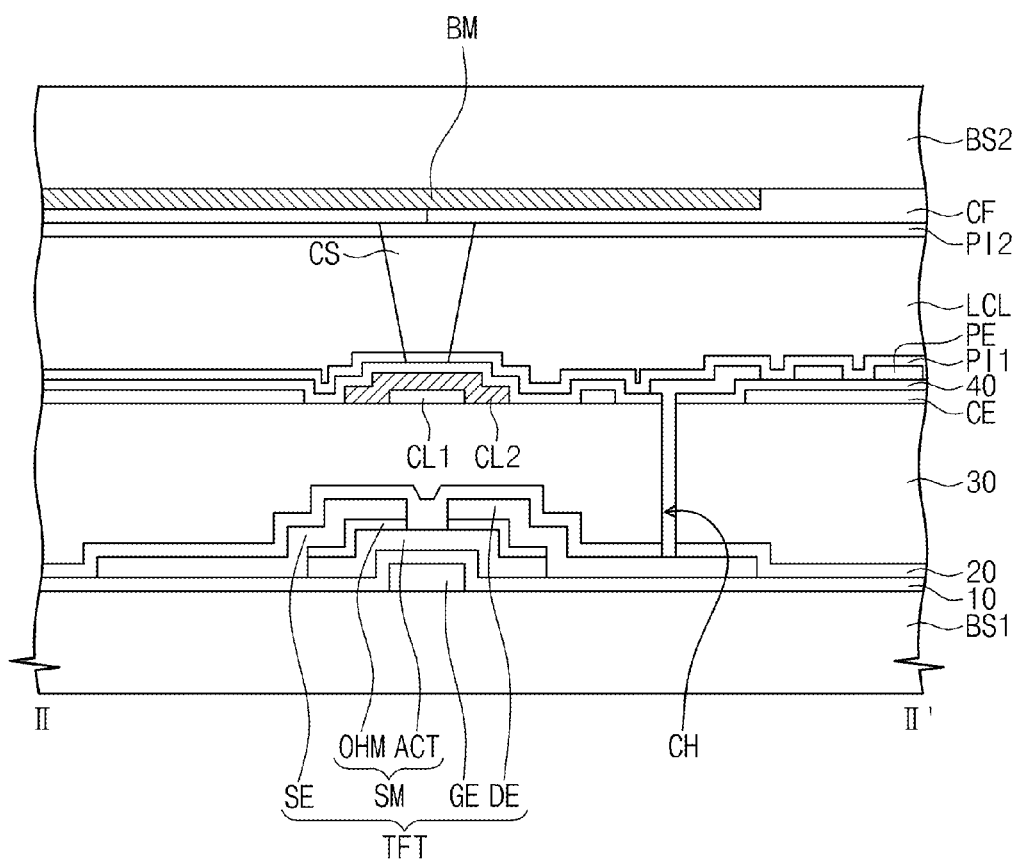

Referring to FIGS. 9A and 9B, the color filter layer CF, the black matrix BM, and the spacer CS are formed on the second base substrate BS2.

The color filter layer CF is formed by forming a color layer displaying red, green, blue, or other colors on the second base substrate BS2 and patterning the color layer through a photolithography process. However, the method of forming the color filter layer CF should not be limited thereto or thereby. That is, the color filter layer CF may be formed, for example, through an inkjet method instead of the photolithography process.

The black matrix BM is formed by forming a light blocking layer, which absorbs the light, on the second base substrate BS2 and patterning the light blocking layer using a photolithography process. Alternatively, the black matrix BM may be formed through another method, such as an inkjet process. The color layer of the color filter layer CF and the black matrix BM may be formed in various orders. For instance, the black matrix BM may be formed after the red, green, and blue color layers are formed. Alternatively, the red, green, and blue color layers may be formed after the black matrix BM is formed.

The spacer CS is formed by forming a glass or plastic material on the second base substrate BS2, on which the color filter layer CF and the black matrix BM are formed, and patterning the glass or plastic material using a photolithography process. The spacer CS is formed in a position on the second base substrate BS2 so as to correspond to the position of the area in which the first conductive layer CL1 and the second conductive layer CL2 are formed on the first base substrate BS1 when the first and second based substrates are coupled.

The second base substrate BS2 including the spacer CS formed thereon is coupled to the first base substrate BS1 and the spacer CS and the liquid crystal layer LCL having the liquid crystal molecules are interposed between the second base substrate BS2 and the first base substrate BS1.

Although the example embodiments of the present disclosure have been described, it is understood that the present disclosure should not be limited to these example embodiments but various changes and modifications can be made by one ordinary skilled in the art within the spirit and scope of the present disclosure including the following claims.

What is claimed is:

1. A display device comprising:
    a first substrate;
    a second substrate defined by a display area and a non-display area and facing the first substrate;
    a spacer interposed between the first substrate and the second substrate and maintaining a distance between the first substrate and the second substrate; and
    a liquid crystal layer interposed between the first substrate and the second substrate, wherein the first substrate includes:
    a first base substrate;
    a common electrode disposed on the first base substrate;
    a pixel electrode disposed to overlap with the common electrode and insulated from the common electrode;
    a first conductive layer disposed at a position on the first base substrate overlapping, in a plan view, a position of the non-display area on the second base substrate, the first conductive layer spaced apart from the common electrode; and
    a second conductive layer disposed on the first conductive layer,
    wherein the second substrate includes a second base substrate facing the first base substrate, and
    the spacer is disposed in the non-display area of the second base substrate to overlap with the first conductive layer and the second conductive layer when viewed in a plan view.

2. The display device of claim 1, wherein the first conductive layer comprises a same material as the common electrode.

3. The display device of claim 1, wherein the first substrate further comprises:
    a gate line extending in a first direction;
    a data line extending in a second direction substantially perpendicular to the first direction; and
    a thin film transistor connected to the gate line and the data line configured to apply a signal to the pixel electrode.

4. The display device of claim 3, wherein the first substrate further comprises an insulating layer disposed on the thin film transistor.

5. The display device of claim 4, wherein the common electrode is disposed on the insulating layer.

6. The display device of claim 5, further comprising an auxiliary line electrically connected to the common electrode to apply a common voltage to the common electrode.

7. The display device of claim 6, wherein the auxiliary line is overlapped with the gate line and extends in the first direction.

8. The display device of claim 7, wherein the second conductive layer comprises a same material as the auxiliary line.

9. The display device of claim 8, wherein the second conductive layer and the auxiliary line comprise a metal material.

10. The display device of claim 1, wherein the first conductive layer has a size equal to or greater than a size of the spacer when viewed in a plan view.

11. The display device of claim 10, wherein the second conductive layer has a size equal to or greater than a size of the first conductive layer when viewed in a plan view.

12. The display device of claim 1, wherein the pixel electrode comprises a plurality of slits.

* * * * *